United States Patent [19]

Whalen

[11] Patent Number: 5,102,679
[45] Date of Patent: Apr. 7, 1992

[54] HALF PRODUCTS FOR MICROWAVE PUFFING OF EXPANDED FOOD PRODUCT

[75] Inventor: Paul Whalen, Elk River, Minn.

[73] Assignee: General Mills, Inc., Minneapolis, Minn.

[21] Appl. No.: 633,838

[22] Filed: Dec. 26, 1990

[51] Int. Cl.⁵ .................. A23L 1/025; A23L 1/18
[52] U.S. Cl. ........................... 426/549; 426/242; 426/243; 426/446; 426/560
[58] Field of Search ......... 426/549, 446, 242, 243, 426/560

[56] References Cited

U.S. PATENT DOCUMENTS

| | | | |
|---|---|---|---|
| 3,077,406 | 2/1963 | Benson | 426/446 |
| 3,453,115 | 7/1969 | Clausi et al. | 426/446 |
| 3,454,403 | 7/1969 | Maxwell | 426/446 |
| 3,652,294 | 3/1972 | Marolta et al. | 426/446 |
| 3,966,990 | 6/1976 | Cremer et al. | 426/446 |
| 4,251,551 | 2/1981 | Van Hulle et al. | 426/446 |
| 4,409,250 | 10/1983 | Van Hulle et al. | 426/242 |
| 4,678,882 | 7/1987 | Bohrer et al. | 426/243 |
| 4,734,289 | 3/1988 | Yamaguchi et al. | 426/242 |
| 4,751,090 | 6/1988 | Belleson et al. | 426/242 |
| 4,873,110 | 10/1989 | Short et al. | 426/621 |
| 4,950,492 | 8/1990 | Shachat et al. | 426/243 |

FOREIGN PATENT DOCUMENTS 0338239 10/1989 European Pat. Off.

OTHER PUBLICATIONS

Food Manufacture, Mar., 1990, pp. 37–38.

Primary Examiner—Donald E. Czaja
Assistant Examiner—Mary S. Mims
Attorney, Agent, or Firm—John A. O'Toole

[57] ABSTRACT

Disclosed are half products especially adapted to be puffed by consumers by at-home microwave heating to form puffed food products. The finished products comprise both R-T-E cereals and snack products. The half products are fabricated from cooked farinaceous doughs comprising rice flour, wheat starch, oil and salt, which have been gelatinized by subjecting the mixture to high shear mixing during heating. The half products further essentially comprise an exterior or topical sugar coating.

42 Claims, No Drawings

HALF PRODUCTS FOR MICROWAVE PUFFING OF EXPANDED FOOD PRODUCT

1. Field of the Invention

The present invention relates to food products. More particularly, the present invention relates to half products for the at-home microwave heating puffing to prepare an expanded food product useful as either an R-T-E cereal or snack product as well as to the finished puffed snack pieces themselves.

2. Background of the Invention

It has long been known that certain starch containing or farinaceous doughs will expand or puff upon appropriate heating conditions. Such doughs are puffed by causing trapped moisture to expand from the liquid state to the vapor phase. Rapid heating or rapid depressurizing are the methods commonly used to convert relatively hard, dense starch-containing doughs generally called "half products" or "pellets" into puffed, crisp food pieces.

Rapid depressurization of a superheated cereal dough such as gun puffing is one well known method and is used especially to prepare puffed R-T-E cereals. Deep fat frying is an example of rapid heating and is especially popular for the preparation of snack foods. Deep fat frying, however, has certain disadvantages. The resulting fried puffed snacks typically have high fat levels (apx. 20% to 35%) rendering the snacks high in calories and fat content. Moreover, the high fat content limits the shelf life of the product even when carefully packaged.

Microwave heating has also been taught generally as being useful as a rapid heating/puffing method for various starch-containing materials. For this reason, many references teaching products designed for one type of puffing, e.g., deep fat frying, also contain an incidental disclosure that the products can also be puffed using microwave heating. However, generally, doughs formulated primarily for puffing by other methods have had particularly poor microwave puff success rates. With the increasing number of consumer microwave ovens in homes, it would be desirable if puffed snack products could be prepared at the consumers convenience by microwave puffing of commercially prepared puffable half products.

While microwave methods could eliminate certain disadvantages inherent in deep fat frying, the at-home microwave puffing by consumers is also not without certain disadvantages. Half products subjected to microwave heating have not all successfully puffed, resulting in unpuffed pieces. Those half products which do not successfully puff can dry, harden and even char under microwave heating. Because even small numbers of unsuccessfully puffed half products or, equivalently herein "unpuffed pellets," can adversely affect overall product quality, high puff success rates are vital to consumer acceptance. Moreover, even those products which do puff in consumer microwave heating can adversely be affected by other poor puffing performance attributes. For example, while certain pellets may expand uniformly, the expansion can be deficient in degree, leading to a less dense, harder finished product. Also, certain pellets may experience nonhomogeneous microwave expansion characterized by certain portions of the pellet expanding to normal desired densities while other portions exhibit deficient expansion. This phenomenon of differential expansion is especially undesirable and unfortunately, also most severe when pellets having a distinctive appearance, such as irregular or character shaped pellets, e.g., airplanes, animals, etc. are employed.

Still another problem is that the pellets can stick to one another during microwave heating which in turn can aggravate the other above described problems associated with microwave heating. This adhesion problem tends to be worse with shelf stable half products and to worsen over storage time. Also, the half products tend to loose moisture over time even when carefully packaged which moisture loss also tends to aggravate performance deficiencies. Moreover, puffing performance can also be adversely affected by the size of the pellets worsening with increasing size since uniformity in heating becomes more difficult as half product size increases.

The prior art reference (see European Patent application 89104274.9; Publication No. 0/338/239 entitled "Microwave Food Products and Methods For Producing Them" by Short et al.) discloses a farinaceous dough based uncase hardened half product for microwave heating prepared by low shear extrusion cooking. However, the expanded finished products are relatively hard and glassy in texture.

The prior art also includes attempts to overcome the deficiencies to which microwave puffable half pellets are prone. In particular, U.S. Pat. No. 4,409,250 (issued Oct. 11, 1983 to Van Hulle et al.) discloses a food product comprising a plurality of puffable pellets dispersed in a puffing medium wherein in preferred embodiments the puffing medium was in substantial excess to the pellets. The puffing media disclosed comprises a sugar syrup which upon microwave heating simultaneously functions to improve microwave puffing performance and also, importantly, to provide the finished puffed product with a thick sugar glazing characteristic of caramel popcorn. The pellets were fabricated from cooked cereal doughs which after cooking additionally included pregelatinized high amylopectin starch. Similar food products, but comprising a cheese powder and oil based puffing medium are disclosed in U.S. Pat. No. 4,251,551 (issued Feb. 17, 1981, to Van Hulle et al.).

While effective, these disclosures are directed towards providing cheese coated or caramel coated microwave puffed pieces. Such food products, while useful in one case as a snack food, are characterized by relatively high fat content and in the other embodiment, by a relatively high sugar and moisture content. Thus, it would be desirable to be able to prepare a microwave puffed snack conveniently by heating such as in a conventional consumer microwave oven whenever desired but characterized by a low fat content and/or sugar content. Additionally, it would be desirable to provide a product which could be used as a freshly prepared R-T-E cereal having an extended bowl life in milk. Also, the products are dispersed in a surrounding media. It would be desirable to provide pellets which are free flowing.

It is a further object of the present invention to provide puffable food compositions having high puff success rates upon microwave heating.

It is a further object of the present invention to provide food products for preparing puffed snack products which minimize hot spotting upon microwave heating.

It is a further object of the present invention to provide a half product comprising a bran and/or gluten component which nonetheless can be consumer microwave puffed.

Still another object of the present invention is to provide half products for the at-home microwave preparation of puffed R-T-E cereals.

A further object of the present invention is to provide half products for the at-home microwave preparation of puffed snack products.

Another object of the present invention is to provide half products for the at-home microwave preparation of puffed food pieces which exhibit improved resistance to sticking to each other upon microwave puffing.

Surprisingly, the above objectives can be realized and improved half products for the consumer microwave heating puffing obtained. The improved half products are prepared from high shear cooked cereal doughs formed into discrete puffable preformed farinaceous pieces. The doughs essentially comprise rice flour, wheat starch and/or flour, oil and salt. The pellets are further essentially defined by a moisture content ranging from about 8% to 15% and as being case hardened. The pellets further essentially comprise a dried sugar coating of about 5%. By virtue of the highly worked dough in combination with sugar coating features, half products can be obtained which are particularly suitable for use in the at-home consumer preparation by microwave heating of puffed finished food products without requiring the special environment of a microwave popping bag.

SUMMARY OF THE INVENTION

In its product aspect, the present invention resides in half products or pellets especially useful in the at-home preparation of a puffed finished food product. The finished puffed food products include both R-T-E cereal embodiments and snack food embodiments.

The half products are fabricated from gelatinized farinaceous cereal doughs essentially comprising 1) rice flour, 2) wheat flour, 3) wheat starch, 4) sugar(s), 5) fatty triglyceride, 6) salt, and moisture. The half pellets desirably weigh about 0.05 to 3.5g each. The pellets further essentially include a sugar coating. The pellets are further essentially characterized by being puffable to at least 3X their original size, and as being case hardened. The dough is further essentially characterized as being a high shear dough.

In its method aspect, the present invention resides in methods for producing microwavable half products comprising the steps of 1) forming a preliminary mixture comprising a starch-containing material, comprising rice flour, wheat starch and/or wheat flour, oil, sugar(s), salt and added water adequate to bring the total moisture content of the mixture from about 16% to about 35% by weight; 2) gelatinizing the starch content of the mixture to form a dough by subjecting the mixture to high shear agitation while heating to prepare a highly worked dough; 3) extruding the resulting dough through a shaped die and cutting to provide formed dough pieces; 4) drying the formed dough pieces to form half products having a moisture content of from about 9.5% to about 17% by weight under conditions which result in at least some case hardening; and 5) sugar coating the half products to provide a sugar coated half product having a weight ratio of sugar coating to half product ranging from about 0.02 to 0.08:1.

DETAILED DESCRIPTION OF THE INVENTION

The present invention relates to food compositions, which upon simple microwave heating gradually form fresh, warm, puffed, crisp snacks or R-T-E cereal pieces. In its method aspect, the present invention relates to processes for the preparation of such snacks. The present food products essentially comprise a plurality of discrete puffable pieces topically coated with a minor amount of a dried sugar coating. Each of the pellet composition ingredients as well as methods of product preparation and product use are described in detail below.

Throughout the specification and claims, percentages and ratios are by weight and temperatures are given in degrees Fahrenheit, unless otherwise indicated.

The present food products essentially comprise a plurality of discrete puffable pieces which are adapted to be gradually puffed by the consumer at home with a conventional household microwave oven. Such food products are often referred to in the snack food art as "half products" or, sometimes, "pellets." Consumer microwave ovens generally provide between 300-800 watts of microwave energy and more typically about 700 watts for newer models. With a typical volume in the microwave cavity of about 1 $ft^3$, the power density of a newer consumer microwave oven is about $0.25 \pm 20\%$ W/$cc^3$. By the term "puffable" it is meant the ability of the "pieces" to expand gradually (i.e., over a period of several minutes) in volume upon microwave heating at conventional microwave oven frequencies (e.g., 2450 MHz) and power densities (about 0.25 W/$cc^3$) and to retain at least three times their original volume (hereinafter "3X") upon cooling. The term "piece" is used herein to refer to a shaped, gelatinized dough product which has not yet been subjected to sufficient heat to cause the product to puff. The term "pellet" is used herein to refer to highly preferred puffable piece embodiments of roughly spherical shape or other rounded shape and generally weighing between 0.5 and 1.2 grams. The term "half product" is meant to include not only pellets but also puffable pieces of more complex shapes, e.g., rings, twists, wagon wheels, stars, cornucopias, etc. which may be larger in size. In the following description it is to be understood that puffable pieces of various shapes can be used even though pellets are specifically described.

The half products herein are prepared from puffable gelatinized farinaceous doughs which have moisture contents essentially ranging between about 8% to 15% by weight of the pellets' dough, preferably from between about 9% to 13% and, most preferably, between about 11.5% and 12.5%. Maintenance of pellet dough moisture contents within the above given ranges is important to insure sufficient moisture to puff the pellets without scorching and to insure extended pellet shelf storage stability.

In the first step of the present method, a preliminary mixture of dry ingredients is formed. The mixture essentially comprises rice flour, wheat starch and/or wheat flour, and oil, together with minor amounts of salt, flavors, emulsifiers. In preferred embodiments the doughs additionally essentially comprise about 1% to 15% of a commercially available modified cross-linked tapioca starch, preferably about 1% to 3%. In more preferred embodiments, the wheat flour, rice flour and wheat starch are in a weight ratio of (0.9 to 1.1):(0.9 to 1.1):(0.9 to 1.1). Better results in terms of puffed volumes are obtained when these ingredients are in a ratio of about 1:1:1.

The puffable farinaceous doughs can optionally comprise minor amounts of additional supplementary farinaceous materials. The supplementary farinaceous materials can include the flours and/or starch fraction derived from various cereal grains or tuber flours or starches such as those of corn, wheat (hard or soft), rice, buckwheat, arrowroot, tapioca, potato, oat, barley, rye or any combination of two or more. If present, such supplemental farinaceous materials can comprise from about 1% to 20% of the present doughs.

Sucrose is a highly preferred optional component of the pellet dough for those embodiments wherein an R-T-E cereal puffed product is desired. If present, sucrose can comprise from about 0.1% to 15% of the dough and preferably between about 5% and 11% and for best results about 8% to 10%. This optional sucrose is incorporated into the dough and is in addition to the essential topical sugar coating described below. In contrast, those embodiments intended to produce snack products, especially those which are cheese and/or savory flavored, typically will not comprise significant levels of sucrose.

Another highly preferred optional component of the present pellet doughs is common salt. In addition to its seasoning function, salt surprisingly has a beneficial effect upon the puffing ability of the pellet amylopectin doughs even in the presence of sucrose. If present, salt comprises from about 0.1% to 10% of the pellet dough, preferably between 0.5% to 5% and most preferably between 1% and 2%.

Most surprisingly, conventional fatty triglyceride, i.e., fat, oils and shortenings can be added to the pellet amylopectin doughs without significantly effecting puffability. Inclusion of a fatty triglyceride component into the dough is useful for control of the puff volume of the finished puffed product. Generally, as the fat level increases, the finished puff volume decreases. If present, such shortenings can comprise from about 0.1% to 5% of the doughs. Surprisingly, higher fat levels are preferred for those embodiments intended to be used to prepare R-T-E cereal puffed finished products. Such R-T-E cereal products are characterized by puff volumes of about 3× to 5×, preferably about 4× to 5×. Such products can be prepared from half products herein fabricated from cereal doughs comprising about 3% to 5% of a fat component. For those half product embodiments useful for the preparation of puffed snack products, the doughs should comprise about 0.1% to less than about 3% fat. Snack finished products herein are essentially characterized by higher puff volumes, >5× and can range from about 5× to 9×.

Suitable conventional shortening materials include, for example, edible fatty triglyceridic materials derived from cottonseed oil, soybean oil, coconut oil, peanut oil and the like. Typically, such materials are partially hydrogenated to Iodine Values of less than about 90 to increase storage stability. Other suitable shortening materials and methods of preparation are described in Bailey "Industrial Oil and Fat Products," Interscience Publishers, a division of John Wiley & Sons (3rd Edition, 1964) which is incorporated herein by reference. If employed, however, it is important that the fat component be worked uniformly into the dough rather than oiling out to the pellet surface. Such oiling out of the fat layer can adversely affect the adherence of the popping casing to the pellet. Conventional emulsifiers can be used to facilitate preparation of a dough with the fat uniformly dispersed.

Minor optional pellet dough ingredients include, for example, colors, dyes, flavors, vitamins, preservatives and the like. If present, such minor optional components comprise from about 0.1% to 2% by weight of the pellet dough.

Nonfat dry milk solids or conventional cheese solids are to be avoided in the pellet doughs since such materials undesirably contain reducing sugars and protein/peptones. Doughs containing both reducing sugars and protein can undesirably undergo non-enzymatic browning reactions upon microwave heating.

Generally, the preblend of the essential dry materials such as starch(es) together with other optional ingredients such as cereal flour(s), sugar and salt are next combined with water and are then formed into gelatinized doughs. Such gelatinized doughs, of course, can be prepared in various well-known manners. For example, gelatinized doughs can be simply prepared by admixing water and pregelatinized starchy materials. Pregelatinized materials generally, and for purposes of the present invention, are those which swell in water which is at a temperature of 25° C. to the extent that one gram of the starch will absorb at least about 10 grams of water. This determination may be conducted by dispersing one gram of pregelatinized starch material and 100 mm of water (at 25° C.) which is contained in a 100 mm graduated cylinder and thereafter noting the volume displacement by the sediment which is formed. A sediment volume of at least 10 mm qualifies the gelatinized starchy material as one suitable for use herein.

In more preferred embodiments, the gelatinized doughs can be prepared by cooking to gelatinize doughs of ungelatinized materials. Other variations include using some pregelatinized material in combination with other ungelatinized materials which have been separately cooked and the two materials thus separately gelatinized are mixed together to form a gelatinized dough.

When ungelatinized material is used, the cooking or gelatinizing of the starch material is performed under conditions commonly used in the food industry. Either a batch cooking or continuous cooking operation can be used. Different methods of cooking include heating at atmospheric pressure in an agitated kettle, heating at elevated pressure in a tumbling type mixer and heating under high pressure in a continuous mixer-extruder.

The preferred method of gelatinizing the dough ingredients with an excess of water is by cooking in an extruder under pressure. Such a process is both continuous and flexible. For example, pregelatinized material, if used, can be simultaneously blended with the other starch material to yield an homogeneous gelatinized dough. Additionally, the use of higher pressures attainable in the extruder allow the use of higher temperatures and also lower water levels than are possible with a batch type cooking operation. The use of lower water levels thus minimizes the amount of drying required in subsequent steps. Using an extrusion type process at 100 to 200, psig at about 250° F. to 350° F., approximately 12% to 25% water based on the total moisture is sufficient to gelatinize the dough. Preferably, the gelatinized dough exiting the extruder has a moisture content of about 15% to 20% and for best results about 18%.

It is important that during the cook and dough forming step that the dough ingredients are subjected to high shear so as to realize a high shear cooked cereal dough. Preferably herein, a twin screw extruder is employed to cook the ingredients and to form the dough since a twin screw type of extruder is more easily capable of imparting adequate shear to the dough. A twin screw extruder is capable of adjustment such as by adjusting the internal flight arrangement to vary the amount of shear. More preferred for use herein is to practice the present method of product preparation so as to maximize the amount of shear imparted by the twin screw such as by arranging the flights in what is referred to as a "reversed" position. While the highly sheared or worked dough is not readily analytically characterizable, imparting high shear to the dough is important to realizing adequate puffing in the puffed finished product. Accordingly, sufficient shear or work is readily determined by end product performance.

The gelatinized dough can be thereafter shaped into any desired geometric form of individual or discrete puffable pieces although spherical pellets are preferred. For the preparation of small pellets, the dough can be extruded in a wide variety of equipment and the extrudate cut off in the form of small pellets ranging in size between about 2 mm to 15 mm in diameter and generally each weighing between 1g to 3.5g for snack products and about 10 mm to 12 mm in diameter and about 0.05 to 2g for R-T-E cereal products. Preferred shapes include toroids (rings). Such shapes are preferred since such shapes are rounded yet have high surface area and exhibit superior puffing performance with regard to evenness of expansion relative to other shapes such as squares having corners.

After such shaping/sizing, the gelatinized dough pellets can be adjusted (e.g., partially dried) to a suitable puffing moisture within the essential 5% to 15% total moisture content range. Preferably, the moisture content ranges from about 8% to 14% and for best results around 12%. Any method of conventional drying can be used to reduce the moisture content of the pellets. The drying operation can be accomplished using equipment such as rotary bed, tray and belt dryers to form the present dried dough pellets. Simple hot air convection drying is the preferred method of pellet drying.

The drying process must be controlled so that the moisture transfer to the atmosphere of the dryer from the pieces causes some case hardening. If the moisture loss occurs only from the outer surface of the pellets while the inner portion of the pellets retain moisture, then the total moisture of the pellets may be within the required 5% to 15% range, then the pellets will puff or expand properly during puffing. This better puffing results from the starch material in the outer portion of the preformed pellets having little or no moisture with which to expand during the microwave puffing step. If the air convection drying operation is carried out at about 70° F. to 200° F. (relative humidity at least 35%) the pellets will be dried within about four hours and the moisture distribution within the pellets will be proper so as to reduce the moisture content to between 12% to 18%.

Thereafter, the present methods of product preparation essentially comprise the step of applying a sugar coating to the dough pieces. Pellets with greater than 8% sugar as sucrose or high levels of wheat starch will exhibit stickiness and clump extensively. The sugar coating greatly improves puffing properties by reducing adhesion between the half product pieces which can be aggravated by storage time and conditions. Conventional sugar coating syrups or slurries and application techniques can be employed (e.g., an enrober). The sugar syrup can comprise about 10% to 80% sugar, preferably about 40% to 80%. Best results are obtained when the sugar syrup comprises about 70% sugar(s) and the balance water, which optionally can further comprise about 1% of the syrup of adjuvants such as flavors, colors, vitamins, salt and mixtures thereof. In more preferred embodiments, the sugar syrup additionally comprises about 1% to 5%, preferably about 2% to 3% of an emulsified oil component, i.e., a liquid triglyceride with an oil-in-water forming emulsifier dispersed therein in a ratio of oil to emulsifier of about 10 to 3:1. The sugar syrup or slurry can be applied to the dried dough pieces in a conventional tumbler. Sufficient amounts of the syrup are applied so as to firm, upon subsequent drying a sugar coating of about 1% to 2%, preferably about 4% to 6% and for best results about 5%. Higher amounts of the slurry do not adhere to the smooth surface. Lower levels (to 2.5%) result in inadequate coverage of the pellets and clumping may occur upon microwaving. Thus, when a 50% sugar syrup is employed, the weight ratio of syrup to pellets ranges from about 0.02 to 0.10 to 1. Thereafter, the syrup coated pieces are conventionally dried to the final moisture contents specified herein to form sugar coated half products of the present invention. The resultant pellets are free flowing.

While not wishing to be bound by the proposed theory, it is speculated herein that the sugar coating also retards moisture loss during the initial portion of the expansion during the microwave heat puffing step which, in turn, is responsible in part for the superior puff performance of the present half products and pellets.

The pellets can thereafter be conventionally packaged, preferably in a moisture proof lined container for room temperature storage. Conveniently, the present food products can comprise single serving packs, each comprising about 25 to 30g of the half products.

It has been found that within the scope of the above description, it is possible to prepare a wide variety of finished, puffed food products from a wide variety of starting materials such that the physical characteristics of the finished product may be controlled to have a desirable texture and desirable eating characteristics, such as mouthfeel, etc. At the same time, considerable variation is possible in the selection of ingredients.

Composition Use

The food compositions of the present invention can be used to prepare a puffed coated snack product upon microwave heating. A quantity of the half products can be placed on the bottom of an uncovered container and heated by a home microwave unit (having a power density of about 0.25 W/cc$^3$) until the puffable dough pieces slowly expand over several minutes to form puffed products having volumes several times that of the unheated pieces. Upon cooling, the puffed snack food products are fresh, crisp and light and have a glossy, sweet coating and a volume of at least three times ("3×") the volume of the half products. Puff volume is related as the volume of the expanded pellets divided by their volume prior to expansion in the microwave.

In preferred embodiments, the pellets are agitated once during the microwave heating step. The finished puffed food pieces find particular suitability for use as R-T-E cereal pieces and exhibit surprisingly superior bowl life compared to conventional R-T-E cereals.

The food compositions herein are generally marketed in combination with some type of conventional packaging or dispensing means. Such means include wrappers, pouches, tubes, extruding devices and the like. In certain preferred embodiments, the half products are marketed in combination with a bowl having an inner annular ring defining inner and outer bowl portions having an outer diameter of about 6 inches and wall height of about 1.5 inches and an inner annular ring having a diameter of about 2.5 inches (I.D.) and a wall height of about 0.75 inch. When the pellets are placed in the center or inner bowl portions, upon microwave heating as the pellets expand, puffed pellets fall over the lower annular wall into the second, outer bowl portion leaving the unpuffed or still expanding pieces in the inner bowl portion. As the microwave heating continues, the microwaves are thus selectively directed towards the unpuffed or partially puffed pellets remaining in the center bowl portion.

The finished puffed pieces exhibit superior eating qualities of freshness, tenderness and crunchiness without excessive tooth packing. Most importantly, upon microwave puffing, the R-T-E cereal finished products exhibit exceptional bowl lives when combined with milk. However, when puffed by other conventional puffing methods, e.g., jet-zone heating, the finished puffed products exhibit bowl lives of only average duration.

Without further elaboration, it is believed that one skilled in the art can, using the preceding description, utilize the present invention to its fullest extent. The following preferred specific embodiments are, therefor, to be construed as merely illustrative and not limitative of the remainder of the disclosure. It will be appreciated that other modifications of the present invention, within the skill of those in the food art, can be undertaken without departing from the spirit and scope of the invention.

EXAMPLE 1

A microwave puffable half product of the present invention for a snack was prepared having the following formulation:

| Ingredient | Weight % |
|---|---|
| Rice flour | 30.10 |
| Wheat starch[1] | 44.35 |
| Sugar | 12.40 |
| Oil | 3.00 |
| Dextrose | 2.80 |
| Modified tapioca starch[2] | 2.50 |
| Salt | 2.30 |
| Non-fat dry milk | 1.60 |
| Dicalcium phosphate | 0.70 |
| Emulsifier[3] | 0.25 |
| | 100.00% |

[1] A refined wheat starch sold under the trade name Aytex P from Olgivie Mills.
[2] A cross-linked cook up starch with shear stability sold under the trade name Tenderfil 9 from A. E. Staley Co., Inc.
[3] Mono- and diglycerides.

The dry ingredients were first mixed in a ribbon blender with a high speed blender applied for no more than one minute for blending of the oil. The dry mix was then fed at a fill rate approximately 50% to 60% of the maximum capacity of a twin screw cooker extruder. Water is combined at a rate of 20% to 25% of the dry mixture. The feed rates are about seven lbs dry mix/min with 1.6 lb water/min for an 80 mm diameter twin screw extruder. The extruder screw is configured with elements which impart a high degree of shear (reverse screws as opposed to forward screws). The cooked farinaceous dough product exits through two ⅜ to ½ inch guide tubes at the die to form two ropes which exhibit little further radial expansion. The ropes were then conveyed to a forming extruder cooled via a jacket. Pellets were formed into various shapes by extruding through a die. The pellets have a moisture content of about 18%.

The pellets are dried in a conventional tray dryer for about 60 min at a temperature of 165° F. (wet bulb = 100° F.) to provide some case hardening. The optimum final moisture level was between 10% to 12%. Final pellet weight was about 2g/pellet. The pellets were allowed to cool, equilibrate to room temperature and tempered for 8 to 12 hours.

The formulation given above includes sucrose at the 12% level which includes the sugar contributed by a topical sucrose coating of 5% by weight of a sucrose and oil slurry. The slurry was composed of two parts of a 75:25 ratio of oil (i.e., hydrogenated soybean oil) to emulsifier (see dry mix formulation) added to 100 parts of a 50% by weight sucrose slurry. The slurry was brought to a hard boil for complete solubilization of the sugar. Fifty grams of the slurry were enrobed in the customary fashion (applied by sprayed or thin stream of slurry) to 1000g of pellets. The coated pellets were dried briefly (i.e., 20 min) via a tray dryer to return the moisture content to 10% to 12%.

About 1 oz serving (before puffing) of the product is placed in a double dish container to enhance single-step puffing of the product in conventional home microwaves (500 to 750 Watt). The coated pellets exhibited good puff volumes upon microwave heating (apx. 4-5× expansion).

EXAMPLE 2

A microwave puffable half product of the present invention for a ready-to-eat cereal product was prepared having the following formulation:

| Ingredient | Weight % |
|---|---|
| Whole ground white wheat flour | 21.00 |
| Rice flour | 31.70 |
| Wheat starch | 27.00 |
| Sugar | 12.00 |
| Oil | 3.10 |
| Modified tapioca starch | 2.50 |
| Salt | 1.60 |
| Dicalcium phosphate | 0.70 |
| Emulsifier | 0.26 |
| Vitamin mixture | 0.14 |
| | 100.00% |

The R-T-E cereal is distinguished from the snack texture by the inclusion of the whole white wheat flour at 21% in the formula. The result is a texture after puffing which exhibits characteristics such as crispness and resistance to sogginess in milk, and organoleptic attributes desirable for R-T-E cereals.

Pellets are prepared from the above formulation in a manner comparable to the procedure described in Example 1 except that the pellets are larger and have an average weight of about 1g. The above formulation includes the sucrose and oil contribution from the topical coating.

About 1 oz of the product was heated at full power for about two minutes. The pellets slowly expand during the heating. Upon cooling, the puffed snack pieces exhibit good puff volume (8-9×), a light crisp texture and have large air cells. The products exhibit minimal spot charring, hard spots or unpuffed pellets.

EXAMPLE 3

A microwave puffable half product of the present invention for a snack was prepared having the following formulation:

| Ingredient | Weight % |
|---|---|
| Wheat starch[1] | 74.32 |
| Sugar | 12.40 |
| Oil | 3.00 |
| Dextrose | 2.80 |
| Modified tapioca starch[2] | 2.50 |
| Salt | 2.30 |
| Non-fat dry milk | 1.60 |
| Dicalcium phosphate | 0.70 |
| Emulsifier[3] | 0.24 |
| Vitamin mixture | 0.14 |
| | 100.00% |

[1] A refined wheat starch sold under the trade name Aytex P from Olgivie Mills.
[2] A cross-linked cook up starch with shear stability sold under the trade name Tenderfil 9 from A. E. Staley Co., Inc.
[3] Mono- and diglycerides.

Pellets are prepared from the above formulation in a manner comparable to the procedure described in Example 1 except that the pellets are larger and have an average weight of about 2-3g. The above formulation includes the sucrose and oil contribution from the topical coating. The formulation given above includes sucrose at the 12% level which exhibits the sugar contributed by a topical sucrose coating of 5% by weight of a sucrose and oil slurry. The slurry is composed of two parts of a 75:25 ratio of oil i.e., hydrogenated soybean oil) to emulsifier (see dry mix formulation) added to 100 parts of a 50% by weight sucrose slurry.

About 1 oz serving (before puffing) of the product is placed in a double dish container to enhance single-step puffing of the product in conventional home microwaves (500 to 750 Watt). The product is heated at full power for about two minutes. The pellets slowly expand during the heating. Upon cooling, the puffed snack pieces exhibit good puff volume (7.75×), a light crisp texture and have large air cells. The products exhibit minimal spot charring, hard spots or unpuffed pellets.

EXAMPLE 4

A microwave puffable half product of the present invention for a ready-to-eat cereal product was prepared having the following formulation:

| Ingredient | Weight % |
|---|---|
| Whole ground white wheat flour | 10.00 |
| Rice flour | 40.00 |
| Wheat starch | 24.30 |
| Sugar | 12.40 |
| Oil | 3.00 |
| Dextrose | 2.80 |
| Modified tapioca starch | 2.50 |
| Salt | 2.30 |
| Non-fat dry milk solids | 1.60 |
| Dicalcium phosphate | 0.70 |
| Emulsifier | 0.25 |
| Vitamin mixture | 0.15 |
| | 100.00% |

Pellets are again prepared from the above formulation in a manner comparable to the procedure described in Example 1 except that the pellets are smaller and have an average weight of about 0.5-1g. The above formulation includes the sucrose and oil contribution from the topical coating.

The product is heated at full power for about two minutes. The pellets slowly expand during the heating. Upon cooling, the puffed snack pieces exhibit good puff volume (7.75×), a light crisp texture and have large air cells. The products exhibit minimal spot charring, hard spots or unpuffed pellets.

EXAMPLE 5

A microwave puffable half product of the present invention for a snack was prepared having the following formulation:

| Ingredient | Weight % |
|---|---|
| Rice flour | 15.00 |
| Wheat starch | 59.30 |
| Sugar | 12.40 |
| Oil | 3.00 |
| Dextrose | 2.80 |
| Modified tapioca starch | 2.50 |
| Salt | 2.30 |
| Non-fat dry milk solids | 1.60 |
| Dicalcium phosphate | 0.70 |
| Emulsifier | 0.25 |
| Vitamin mixture | 0.15 |
| | 100.00% |

The expanded product prepared by microwave heating the half product had a highly expanded volume of about 8.6×.

What is claimed is:

1. A food half product useful for the microwave preparation at home of a puffed food product without a microwave puffing bag, comprising:
   a quantity of microwave heating expansible pellets, where the pellets are fabricated from a gelatinized, high shear starch dough, said dough including
   A. about 1% to 50% of rice flour by weight of the dough,
   B. about 1% to 50% of wheat starch by weight of the dough,
   C. about 1% to 5% of a fatty triglyceride by weight,
   D. about 8% to 15% of the dough of moisture by weight,
   E. about 1% to 5% of the dough of salt by weight,
   wherein the pellet ranges in weight from about 0.7 to 1.2g,
   wherein the pellets are least partially case hardened,
   wherein the pellets are expansible upon microwave heating at a power density of about 0.25 W/cc$^3$ to at least 3 times its initial volume, and
   wherein the pellets are free flowing having a clumping resistant topical dried sugar coating in a weight ratio of pellet to sugar coating ranging form about 15 to 30:1.

2. The food product of claim 1 wherein the dough further comprises:
   F. about 1% to 30% of a whole grain flour by weight of the dough.

3. The food product of claim 2 wherein the dough further comprises:
   G. about 1% to 12% of sugar(s) by weight.

4. The food product of claim 3 wherein the whole grain flour comprises wheat flour.

5. The food product of claim 4 wherein the dough further comprises:
   H. about 1% to 15% of a modified cross-linked tapioca starch by weight of the dough.

6. The food product of claim 5 wherein the dough comprises wheat flour, wheat starch and rice flour in a weight ratio of about (0.9 to 1.1):(0.9 to 1.1):(0.9 to 1.1).

7. The food product of claim 6 wherein the dough further comprises:
   I. about 1% to 20% of a supplementary farinaceous material by weight of the dough.

8. The food product of claim 7 wherein the dough comprises:
   G. about 5% to 11% of sugar by weight of the dough.

9. The food product of claim 6 especially useful as a snack product wherein the dough comprises:
   C. about 3% to 5% of the fatty triglyceride by weight of the dough.

10. A method for preparing a half product useful for the microwave at-home preparation of a puffed food product, comprising the steps of:
   A. forming a preliminary starch-containing mixture, comprising rice flour, wheat starch, and/or flour, oil, salt and added water adequate to bring the total moisture content of the mixture from about 12% to about 355 by weight;
   B. gelatinizing the starch content of the mixture to form a cooled dough by subjecting the mixture to high shear agitation while heating to prepare a highly worked dough;
   C. extruding the resulting cooked dough through a shaped die and cutting to provide formed dough pieces:
   D. drying the formed dough pieces to form dried pieces having a moisture content of from about 9.5% to about 17% by weight under conditions which result in at least some case hardening; and
   E. sugar coating the half products to provide a sugar coated half product having a weight ratio of dried sugar coating to half product ranging from about 0.02 to 0.08:1 to form free flowing finished half product pieces.

11. The method of claim 10 wherein the cooked dough in Step A has a moisture content ranging from about 15% to 20% by weight.

12. The method of claim 10 wherein steps B and C are practiced by twin screw cooker extruding the cooked dough.

13. The method of claim 12 wherein the finished half product pieces each range in weight from about 0.05 to 3.5g.

14. The method of claim 13 wherein the sugar coating step comprises the substeps of:
   applying a sugar syrup to the dried dough pieces, said syrup comprising 40% to 80% sugar by weight of the syrup to form syrup coated pieces, drying the syrup coated pieces to about 10% to 14% moisture content to form finished half product pieces.

15. The method of claim 14 wherein the sugar syrup additionally comprises:
   about 1% to 5% of an emulsified fatty triglyceride by weight of the syrup.

16. The method of claim 15 wherein the dough further comprises:
   about 1% to 30% of a whole grain flour by weight of the dough.

17. The method of claim 16 wherein the dough further comprises:
   about 1% to 12% of sugar(s) by weight of the dough.

18. The method of claim 17 wherein the whole grain flour comprises wheat flour.

19. The method of claim 18 wherein the dough further comprises:
   about 1% to 15% of a modified cross-linked tapioca starch by weight of the dough.

20. The method of claim 19 wherein the dough comprises wheat flour, wheat starch and rice flour in a weight ratio of about (0.9 to 1.1):(0.9 to 1.1):(0.9 to 1.1).

21. The method of claim 20 wherein the dough further comprises:
   about 1% to 20% of a supplementary farinaceous material by weight of the dough.

22. The method of claim 21 wherein the dough comprises: about 5% to 11% sugar by weight.

23. The method of claim 22 especially useful as a snack product wherein the dough comprises:
   about 3% to 5% of a fatty triglyceride.

24. A method for the at-home microwave heating preparation of preparing a puffed snack, comprising the steps of:
   A. providing a quantity of microwave puffable half product pieces, said pieces comprising:
   a gelatinized starch dough, said dough including
      1) about 1% to 50% of rice flour by weight of the dough,
      2) about 1% to 50% of wheat starch by weight of the dough,
      3) about 1% to 50% of whole grain wheat starch by weight of the dough,
      4) about 2% to 4% of an oil by weight,
      5) about 8% to 15% moisture by weight of the dough,
      6) about 1% to 5% salt by weight of the dough,
   wherein the half products range in weight from about 0.5 to 3.5g,
   wherein the half products are at least partially case hardened,
   wherein the half products have an initial volume, and
   where the half products are free flowing having a clumping resistant topical dried sugar coating in a weight ratio of half product to sugar coating ranging from about 15 to 30:1, and
   B. microwave heating the quantity of half products to expand the pieces to form puffed snack pieces having a volume at least three times their initial volume.

25. The method of claim 24 wherein the finished half product pieces each range in weight from about 0.05 to 3.5g.

26. The method of claim 24 wherein the dried sugar coating additionally comprises:
   about 1% to 5% of an emulsified fatty triglyceride by weight of the coating.

27. The method of claim 26 wherein the dough further comprises:

about 1% to 30% by weight of the dough of a whole grain flour.

28. The method of claim 27 wherein the dough further comprises:
about 1% to 12% by weight of sugar(s).

29. The method of claim 28 wherein the whole grain flour comprises wheat flour.

30. The method of claim 29 wherein the dough further comprises:
about 1% to 15% by weight of the dough of a modified cross-linked tapioca starch.

31. The method of claim 30 wherein the dough comprises wheat flour, wheat starch and rice flour in a weight ratio of about (0.9 to 1.1):(0.9 to 1.1):(0.9 to 1.1).

32. The method of claim 31 wherein the dough further comprises:
about 1% to 20% of a supplementary farinaceous material by weight.

33. The method of claim 32 wherein the dough comprises:
about 5% to 11% of sugar by weight.

34. The method of claim 31 especially useful as a snack product wherein the dough comprises:
about 3% to 5% of a fatty triglyceride by weight of the dough.

35. A packaged food article useful for the microwave preparation at home of a puffed food product comprising:
A. a microwave expansible popping bag without a microwave susceptor; and
B. a quantity of microwave heating expansible pieces dispersed within the bag,
wherein the pieces are fabricated from a gelatinized high shear starch dough, said dough including
1) about 1% to 50% of rice flour by weight of the dough,
2) about 1% to 50% of wheat starch by weight of the dough,
3) about 1% to 5% of a fatty triglyceride by weight,
4) about 8% to 15% of the dough of moisture by weight,
5) about 1% to 5% of the dough of salt by weight,
wherein the pieces range in weight from about 0.7 to 1.2g, and
wherein the pieces are expansible upon microwave heating at a power density of about 0.25 W/cc$^3$ to at least 3 times its initial volume, and
wherein the pieces are free flowing having a clumping resistant topical dried sugar coating in a weight ratio of piece to sugar coating ranging from about 15 to 30:1.

36. The food product of claim 35 wherein the dough further comprises:
6) about 1% to 30% by weight of the dough of a whole grain flour.

37. The food product of claim 36 wherein the dough further comprises:
7) about 1% to 12% by weight of sugar(s).

38. The food product of claim 37 wherein the whole grain flour comprises wheat flour.

39. The food product of claim 38 wherein the dough further comprises:
8) about 1% to 15% of a modified cross-linked tapioca starch by weight of the dough.

40. The food product of claim 39 wherein the dough comprises wheat flour, wheat starch and rice flour in a weight ratio of about (0.9 to 1.1):(0.9 to 1.1):(0.9 to 1.1).

41. The food product of claim 40 wherein the dough further comprises:
9) about 1% to 20% of a supplementary farinaceous material by weight of the dough.

42. The food product of claim 41 wherein the dough comprises:
10) about 5% to 11% by weight of sugar.

* * * * *